(12) United States Patent
Barth et al.

(10) Patent No.: US 6,877,685 B2
(45) Date of Patent: Apr. 12, 2005

(54) PROCESSING DEVICE FOR SYNTHETIC MATERIAL

(75) Inventors: Gerold Barth, Ziegelofenweg 13, A-4073 Wilhering (AT); Manfred Dobersberger, Schmiedgasse 28, A-4061 Pasching (AT); Markus Fellinger, Pasching (AT); Günter Kroiss, Bahndamm 2, A-4061 Pasching (AT)

(73) Assignees: Gerold Barth, Wilhering (AT); Günter Kroiss, Wilhering (AT); Manfred Dobersberger, Wilhering (AT)

( * ) Notice: Subject to any disclaimer, the term of this patent is extended or adjusted under 35 U.S.C. 154(b) by 310 days.

(21) Appl. No.: 10/185,916

(22) Filed: Jun. 27, 2002

(65) Prior Publication Data

US 2003/0015612 A1 Jan. 23, 2003

Related U.S. Application Data

(63) Continuation-in-part of application No. PCT/EP00/13271, filed on Dec. 27, 2000.

(30) Foreign Application Priority Data

Dec. 27, 1999 (AT) .............................................. 2193/99

(51) Int. Cl.$^7$ .......................... B02C 19/22; B02C 07/04
(52) U.S. Cl. ..................... 241/260.1; 241/243; 425/202
(58) Field of Search ................................ 241/220, 244, 241/260, 260.1, 250, 243; 366/69, 76.1–76.9, 81, 87; 425/202, 205, 208, 449

(56) References Cited

U.S. PATENT DOCUMENTS 5,102,326 A * 4/1992 Bacher et al. .............. 425/202
5,114,331 A    5/1992 Umehara et al.
5,536,154 A * 7/1996 Bacher et al. ........... 425/302.1
5,783,225 A * 7/1998 Bacher et al. .............. 425/202
6,126,100 A * 10/2000 Barth et al. .............. 241/260.1

FOREIGN PATENT DOCUMENTS

| DE | 1271973 | 7/1968 | |
| DE | 2112306 | 3/1972 | ............. B29F/3/00 |
| DE | 2351328 | 4/1975 | ........... B29C/29/00 |
| DE | 2842162 | 4/1980 | ........... B29C/29/00 |

* cited by examiner

Primary Examiner—Allen Ostrager
Assistant Examiner—Shelley Self
(74) Attorney, Agent, or Firm—Horst Kasper

(57) ABSTRACT

The invention relates to a processing device for, especially thermoplastic, synthetic material. The inventive device consists of a disintegration device and/or a conveying device having an upstream disintegration device and of a directly connected extruding device. The disintegrating/conveying device consists of a knife-carrying processor drum/conveyor worm (3/9) or a combination thereof. Said drum/worm circulates in a conveyor pipe/worm trough (6/38) in a driven manner. Said pipe/worm is provided with a supply opening (11) directed towards the top and an outlet (10). The processing drum (3) or the conveyor worm (9) and the extruder worm (8) are aligned with the longitudinal axes (17, 20) and the processing drum/conveyor worm (3, 9) is detachably and mechanically connected to the extruder worm (8) and both are driven by a transmission (31) and a driving motor (34). The outlet (10) of the conveyor pipe (6) and the inlet (23) of the worm pipe (22) are axially arranged directly one behind the other or are connected by means of a transition pipe (21).

39 Claims, 7 Drawing Sheets

PROCESSING DEVICE FOR SYNTHETIC MATERIAL

CROSS-REFERENCE TO RELATED APPLICATIONS

This application is a continuation-in-part application of another international application filed under the Patent Cooperation Treaty Dec. 27, 2000, bearing Application No. PCT/EP00/13271, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The invention relates to a processing device for comminuting, disintegrating, transporting and plastifying and granulating or for agglomeration of plastic material, in particular of the thermo-plastic kind, comprising a comminuting device with the charging device and a worm extruder.

2. Brief Description of the Background of the Invention Including Prior Art

It is usual in connection with the reprocessing of plastic stock to comminute the plastic stock in a mill and to transport the plastic stock into a silo. The pre-comminuted plastic stock is fed from the silo to an extruder through a plugging machine. This configuration is associated with the advantage that the silo furnishes a storage capacity for balancing variations in the quantity of charge material.

It is a disadvantage of the arrangement to have a bad thermal degree of effectiveness since that the comminution energy, which transfers in the form of frictional heat in the mill onto the plastic material, and which comminution energy is delivered again into the environment based on a further intermediate storage in the storage silo and thereby is lost for the extrusion process. This arrangement is further associated with a disadvantage that a substantial space requirement exists.

In addition devices are known where the plastic material to be reprocessed falls from above into a container, wherein a knife disk rotates on the floor of the container, wherein the material is pre-comminuted with the knife disk and is pressed through an opening disposed in the container wall, where the plastic material is taken up by a worm extruder and is further processed.

It is an advantage of such an arrangement that the comminution energy, which comminution energy enters into the material to be processed in the kind of frictional heat, can be used in the extrusion process. However, the limitation of the size of the material parts with which this arrangement can be fed and the requirement of a continuously uniform charging are a very important disadvantage, because otherwise quickly an overload of the drive motor occurs and interferences of the material preparation and of the material throughput can occur, which are associated with the consequences of output and yield variations and the formation of densified pieces or even at least in part molten up plastic material. Therefore the plastic material to be processed has to be fed in small pieces or particles into the charge container in connection with this arrangement.

The thereby required separation of the comminuted material depending on the size of the pieces becomes expensive and complicated in most cases however, in particular in case of pressed plastic material or in case of large solid parts, because these have to be separated either manually or automatically, whereby a substantial requirement to the workforce or, respectively, an additional important equipment requirement in the form of a coarse comminuting machine becomes necessary.

There is a further known device for the processing of plastic material and filler material such as for example sawdust. The still wet material is to be pre-dried and to be transported in an extruder.

Here exists the disadvantage that the suitable size of the material is limited for the charging, because here also the material passes into the charge funnel based on gravity and an overload of the motor can occur in case of material pieces of too large size.

According to another device for processing of plastic material, a charge device is predisposed to a processing drum furnished with knives, wherein the material collection or the supporting transport wings of a transport screw transport the comminuted material through an opening of the conveyor tube into a worm extruder. The material is plastified and granulating upon passage through the extruder.

The drive expenditure is important in connection with this arrangement, since the extruder and the processing drum have to be driven separately. In addition, there is the necessity that the distances between the transporting parts of the processing drum and of the extruder worm are to be as small as possible in order to always assure that the transfer occurs without problem, which renders necessary an expensive construction.

Substantial counter forces occur finally at the end of the transport path at the processing drum, which counter forces have to be decreased by constructive steps, in particular the unloading of the bearings and the sealing of the bearings.

SUMMARY OF THE INVENTION

1. Purposes of the Invention

It is an object of the present invention to eliminate the disadvantages of the known processing devices as they were described above. The invention is to uniformize the course of the process during the preparatory treatment independent of the size and of the shape of the material as well as of the amount of material which is disposed in the funnel and the invention is to allow the transport of the comminuted plastic material without interferences, wherein a simple construction and a particularly simple drive arrangement is to be created in order to furthermore maintain the advantages of the use of the comminution energy in the extrusion process and in addition to furnish a particularly simple constructed preparatory treatment device, which is little subject to interferences and which balances varying charging volumes.

These and other objects and advantages of the present invention will become evident from the description which follows.

2. Brief Description of the Invention

The present invention provides and this object is accomplished in connection with a processing device. A straight passing through transport path is accomplished by the aligned arrangement of the extruder worm with the preparatory treatment drum, wherein a single drive motor and a single transmission are sufficient for the aligned arrangement. Here the single piece embodiment represents a constructive very simple shape, which can be produced correspondingly cost favorable, while the single piece formation of the processing drum and of the conveyor screw are particular simple in construction in particular with short embodiments such as are suitable for the agglomeration and the single piece formation enables a disengageable connection of extruder worm and processing drum and a simplified maintenance, repair and assembly.

The connection of conveyor tube and of the worm to the extruder by way of a transition tube allows adaptive measures between the rotating and the fixed parts at the same time.

The disengageable connection of the conveyor tube and of the worm to with or without intermediate disposing of a transition tube furthermore improves the accessibility.

The connection of conveyor screw with the disposed preparatory treatment drum with sieving of the comminuted plastic material brings an expansion of the processing possibilities relating to melt masses and compacted masses and to package like densified foil material.

The application of a predisposed preparatory treatment drum above the conveyor screw transports the plastic material through a screwable sieve segment, wherein the screwable sieve segment forms a part of the conveyor tube and the sieve segment reaches at the lower region of the sieve segment from a wall of the trough of the following screw trough of the conveyor in circulating direction of the processing drum and at least over quarter of the circumference of the conveyor tube.

The conveyor screw runs in the screw trough and is guided supportively at the cylindrical tube guidance in the end region on the extruder side, whereby the forces exerted onto the end of the conveyor screw directly and exerted on the extruder worm disengageably mechanically connected to the conveyor screw are discharged advantageously and in a simple fashion.

The drive of the extruder worm and of the preparatory treatment drum is performed with a single motor and a single transmission, whereby a substantial simplification and cost savings are accomplished in particular in connection with small processing devices. The drive of the predisposed preparatory treatment drum can be derived from transmission for the conveyor screw and for the extruder can comprise a separate drive out of a motor and a transmission in case of larger required powers.

The application of a transition pipe can be performed most simply by flanging of the transition pipe to the worm tube of the extruder and to the conveyor tube or, respectively, to the machine casing.

The application of a mouthpiece placed onto the worm tube is advantageous for the improvement of the entry of the comminuted plastic material, wherein the further gradual narrowing of the diameter of the transport path to the diameter of the screw to worm becomes possible with the mouthpiece, because the plugging resistance is thereby decreased and the transport behavior of the plastic materials is improved such that no interruption in the transport occurs based on jamming or melting.

The forming of the bearing body for the extruder side bearing of the processing drum is also important for the unimpeded or at least little impeded flow of the plastic material in transport direction, wherein the use of flow favorable webs is advantageous between the outer bearing part and the inner bearing part. The application of an air flushing for cleaning of the particles of the material is important for reducing the sensitivity to interferences of the bearing, wherein the air flushing maintains charge lines and discharge lines over these webs of the bearing body.

The production of a disengageable connection between the extruder worm and the processing drum can be performed with the connection means known for such purpose; the connection can be made particularly simply directly with a groove and spring wedge connection, wherein an additional screw in from the outside forms easily controllable and secure connection.

The use of a cone body, wherein the cone body is disposed in the transition tube, results in a gradually flowing guiding together of the transport material stock from the larger diameter of the processing drum to the smaller diameter of the worm tube of the extruder, wherein the extruder is suitable for the classification and whereby operational interferences are avoided.

The two-part construction of the cone body, of which tube parts the part on the extruder side is screwed at the bearing pin of the extruder side bearing of the processing drum and wherein the extruder side part towards the flank of the extruder worm, whereas part of the bearing side is attached on the bearing pin of the bearing of the processing drum on the extruder side and in a particularly simple way and forms an effective drive connection disengageable with little requirements, whereby the mounting and assembly work is alleviated. Alternatively the tube parts of the cone body can also be screwed to each other.

A hollow cone transport slot forms between the transition tube and the cone body by way of which a gradual confluence and pre-density compactification of the transport stock from the large diameter of the processing them to the small diameter of the worm tube of the extruder at the entry opening is effected in case of a cone shape of the transition tube, whereby a smaller transport resistance of the plastic material and a particular low interference operation is accomplished. Depending on the diameter ratios, the kind of material and the kind of processing, an opening angle of the transport slot of a few degrees and preferably from 10 degrees to 90 degrees and in particular of about 60 degrees can be employed in arrangements for the plastification.

The cone shape transport slot for the plastic material, which transport slot enables an orderly feeding together to the smaller diameter of the worm tube of the extruder without interfering pluggings, can preferably be formed remaining uniform in the breadth or in case of changes of the degree of density in the region of the transport slot be also formed with exhibiting increasing or decreasing breadth. A common shape transition tube can be dispensed with during agglomeration because of the mostly uniform tube diameter and the opening angle can then amount down to 0 degrees such that the conveyor tube and the extruder tube also can be connected immediately to each other.

The application of a single transport wing is sufficient for conveying the transport of the plastic material in transport direction and for the effective plugging at the entry opening of the worm tube of the extruder, in particular where the transport wing is set transporting in the direction toward the worm tube. In order to cover the conical transport slot, an aligned arrangement of the tube parts of the transport wing is not required and the structure, tube parts, and corresponding to the two parts of the cone body is most simple and most favorable.

The application of a blocking strip in the region of the transport wing is a simple and were effective step for a testing the transport effect, wherein a slot between the blocking strip and the transport wing can be adjusted. The insertion of the blocking strip through an opening of the transition tube alleviates thereby the adjustment. The guiding of a counter plate crude to the transition tube and the setting of the blocking on the transport wing with the screw connection with tension screws and pressure screws is a reliable simple formation.

The adjustment of the slot between the blocking strip and the transport wing determines particularly effectively and simply the influence of the slippage and the thereby the transport behavior of the plastic material.

The arrangement of several injection nozzles for air at the lowest position of the transport tube and aligned in transport direction and disposed at a distance from each other is of advantage for improving the transport effect, wherein the motion of the plastic material in the direction toward the discharge opening of the transport tube is supported with the injection nozzles for air.

The construction of the transport tube with an unscrewable pipe segment represents a particularly simple solution for the elimination of interferences and for the maintenance, wherein the pipe segment reaches over the complete length and at least over a quarter of the circumference in circulation direction and preferably beginning at the lowest position of the inner wall.

The knives on the processing drum are disposed in rows at distances from each other and are applied stepwise staggered in circulation direction and are operating together with a spatially fixed counter knife, wherein the knifes on the processing drum grid through the counter knife, wherein an opening cut can be adjusted by way of which a lesser cut resistance and a decrease of the load peaks is accomplished.

A second counter knife serving as a stripper is furnished at the second longitudinal edge of the feed opening in of the processing drum and a back transport of the plastic material into the charging region is avoided with the counter knife.

The charging of the processing drum occurs with a charging device of simplest construction, wherein a slider or two sliders disposed next to each other and of preferably cylindrical construction in case of small device sizes, wherein the slider is shifted in each case with a pneumatic force cylinder or a hydraulic force cylinder, wherein the cylinder is supported at an enveloping tube, or by an electrical drive against the processing drum and wherein the plastic material is led into the capturing region of the knife.

The hydraulic force cylinders or the electrical drives can be employed in case of larger construction sizes or because of present installations and also a single box shaped slider can be advantageously employed reaching over the breadth of the floor plate.

Advantageously the feed opening extends over more than a quarter of the circumference of the preparatory treatment drum, is applied running downwardly from above, and reaches over the complete length of the preparatory treatment drum for sufficient feeding in of plastic material. A feed in shaft with a fallingly inclined floor plate is particularly advantageous for the charging, wherein the sliders are moved on the floor plate.

The control of the slider is performed automatically through an automatically controlled pressure plant, wherein the press force is automatically controlled with the pressure plant depending on the power and in particular over the current use of the drive motor, in order to accomplish a uniform impacting and load.

The rotation speed of the preparatory treatment drum is automatically controlled advantageously depending on the temperature of the plastic material at the exit opening of the transport tube in order to avoid operational interferences by baking together.

In case of application of a conveyor screw it is advantageous to furnish a guide bush at the end of the cylindrical part of the conveyor screw instead of the described bearing, wherein the support at the machine casing can be performed with the guide bush.

It is particularly advantageous for extruders for agglomeration to provide an end side bearing support of the extruder worm and the then to arrange the stock discharge downwardly instead of the described bearing of preparatory treatment drum or conveyor screw.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing. The invention is described by the way of the drawing.

BRIEF DESCRIPTION OF THE DRAWING

In the accompanying drawing, in which are shown several of the various possible embodiments of the present invention.

There is shown in.

DESCRIPTION OF INVENTION AND PREFERRED EMBODIMENTS

Figure 1:
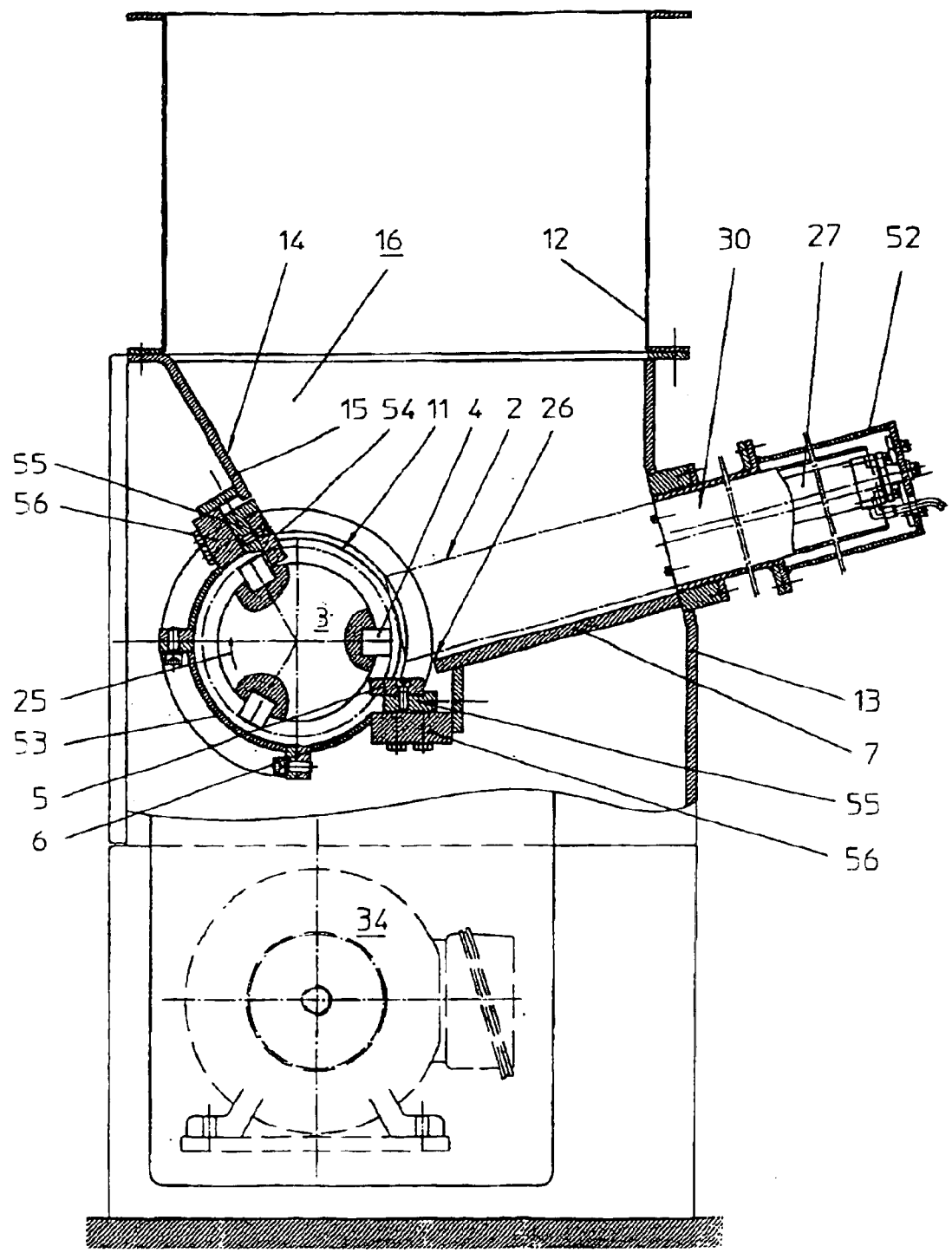
FIG. 1 the preparatory treatment device in a side elevational view, in section.
Figure 2:
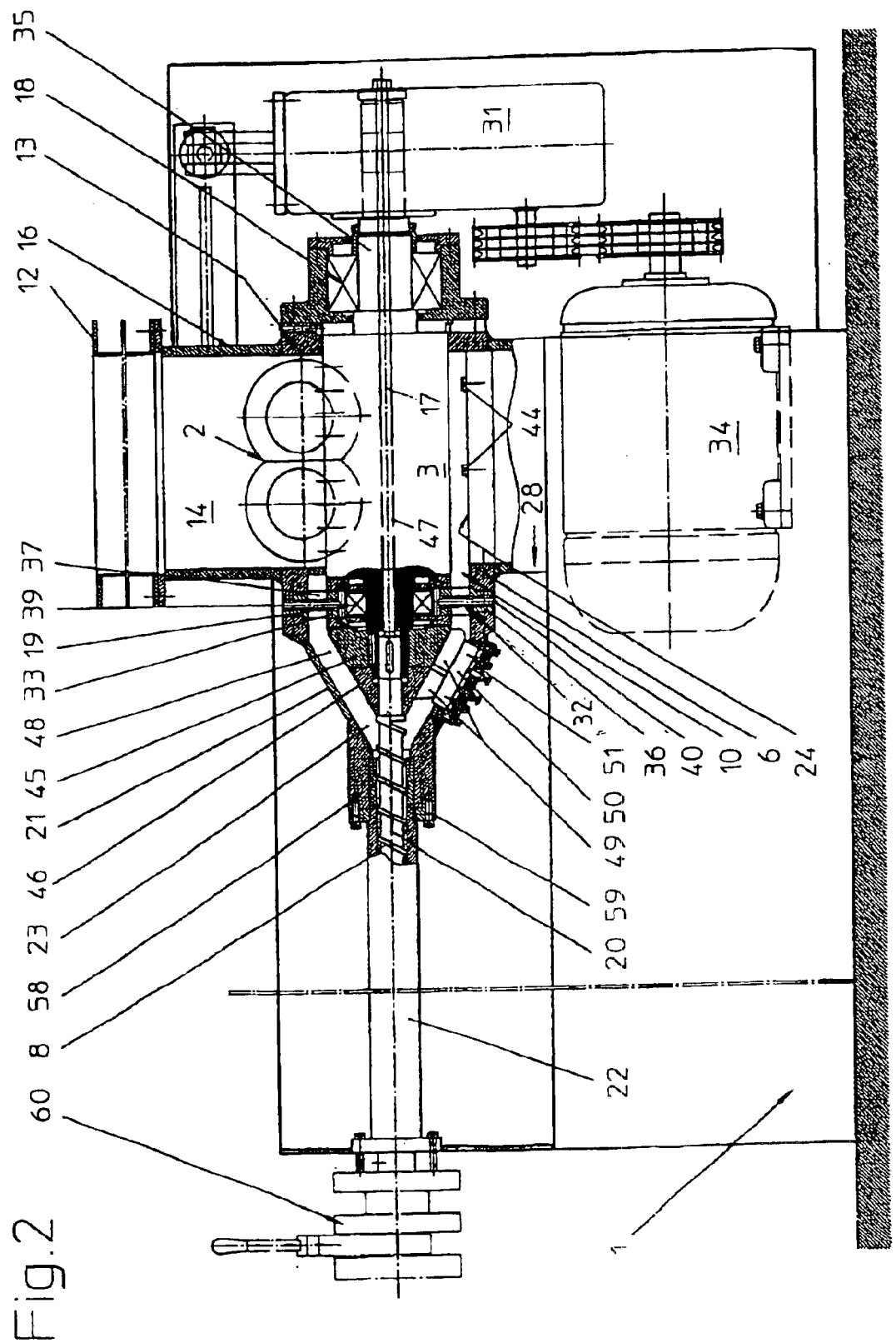
FIG. 2 a cross-section through the preparatory treatment device according to FIG. 1, FIG. 3 the preparatory treatment device with conveyor screw in a side elevational view, in section, FIG. 4 the preparatory treatment device with conveyor screw, according to FIG. 3, in a side elevational view, in section.
Figure 3:
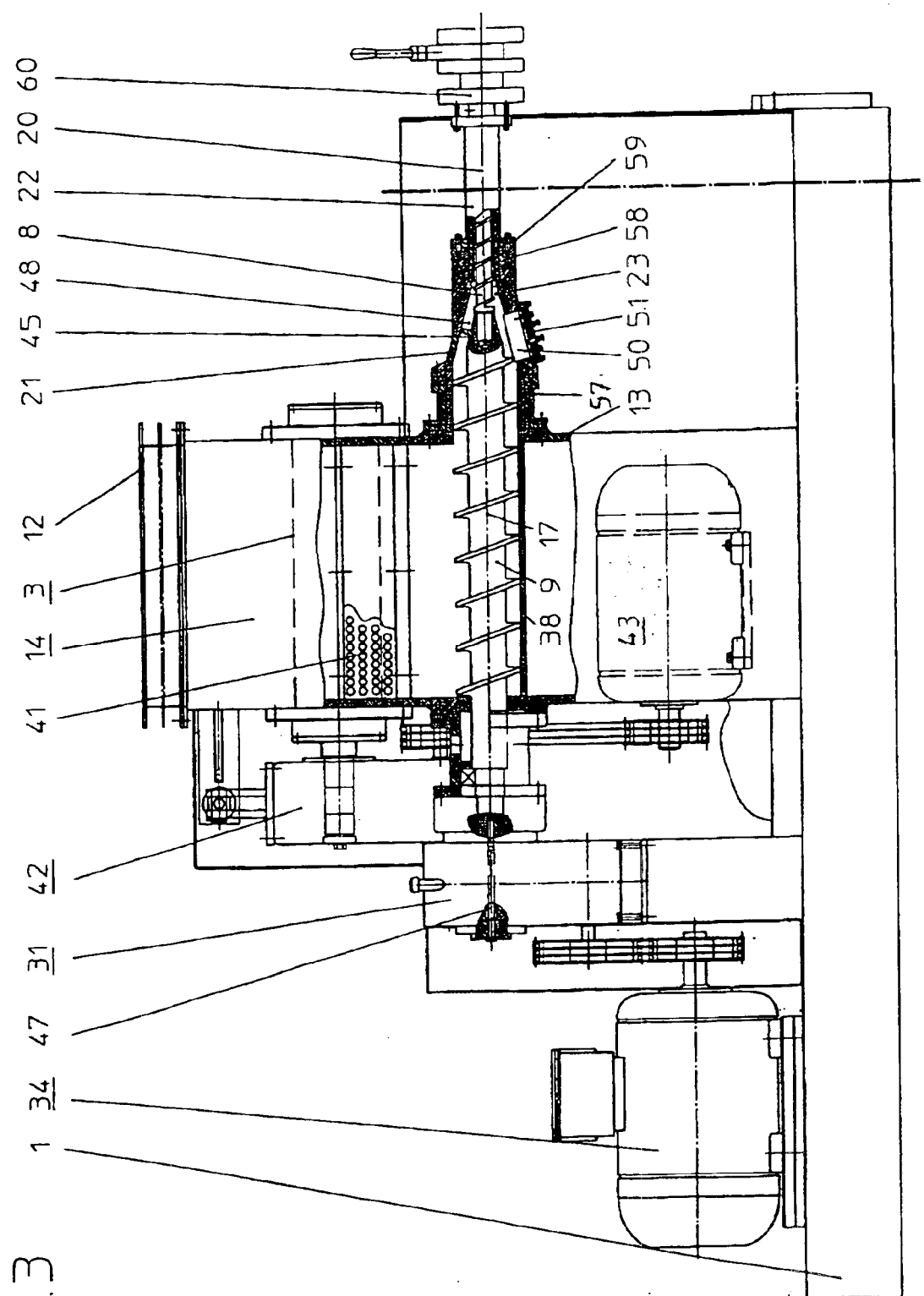
Figure 4:
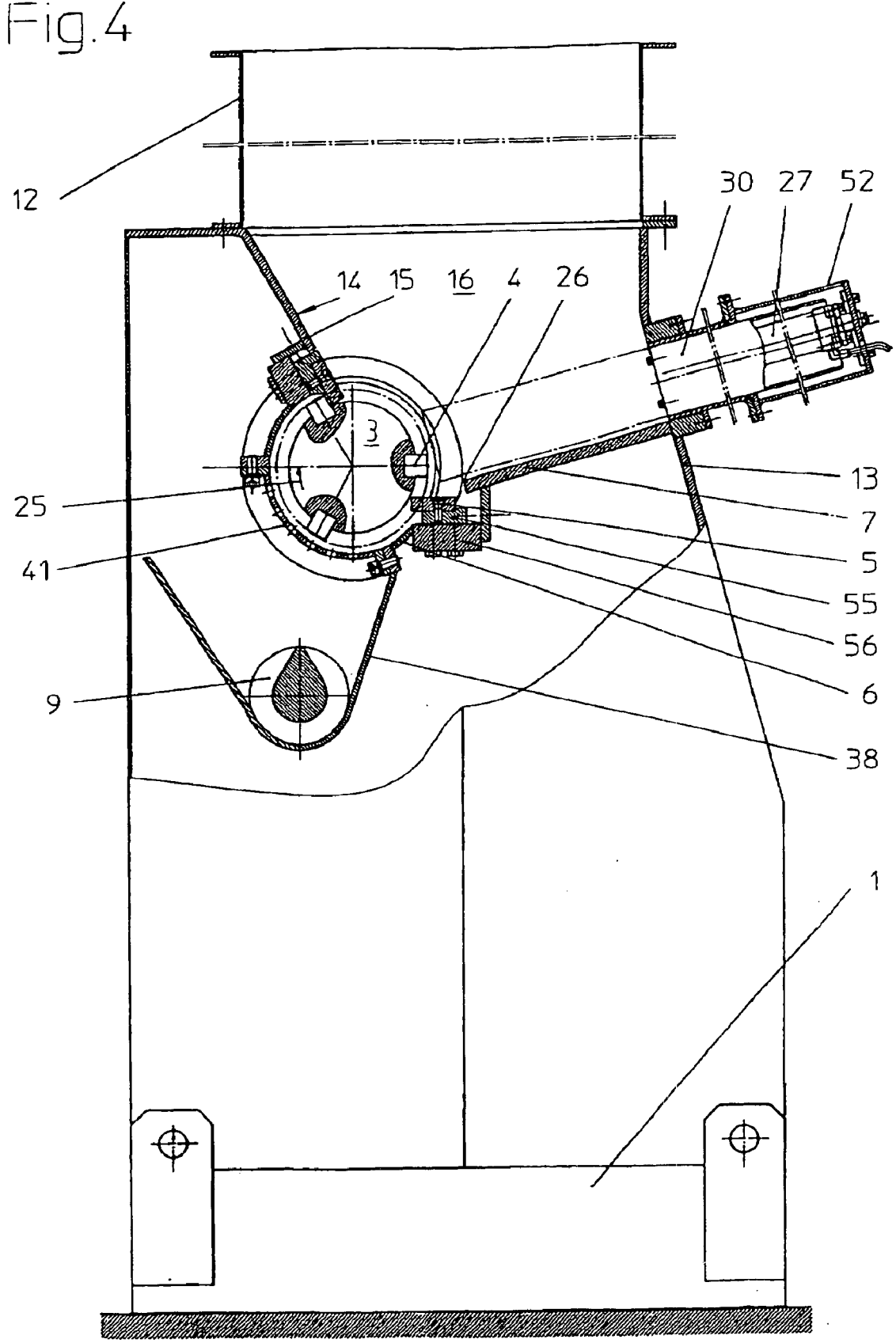
Figure 5:
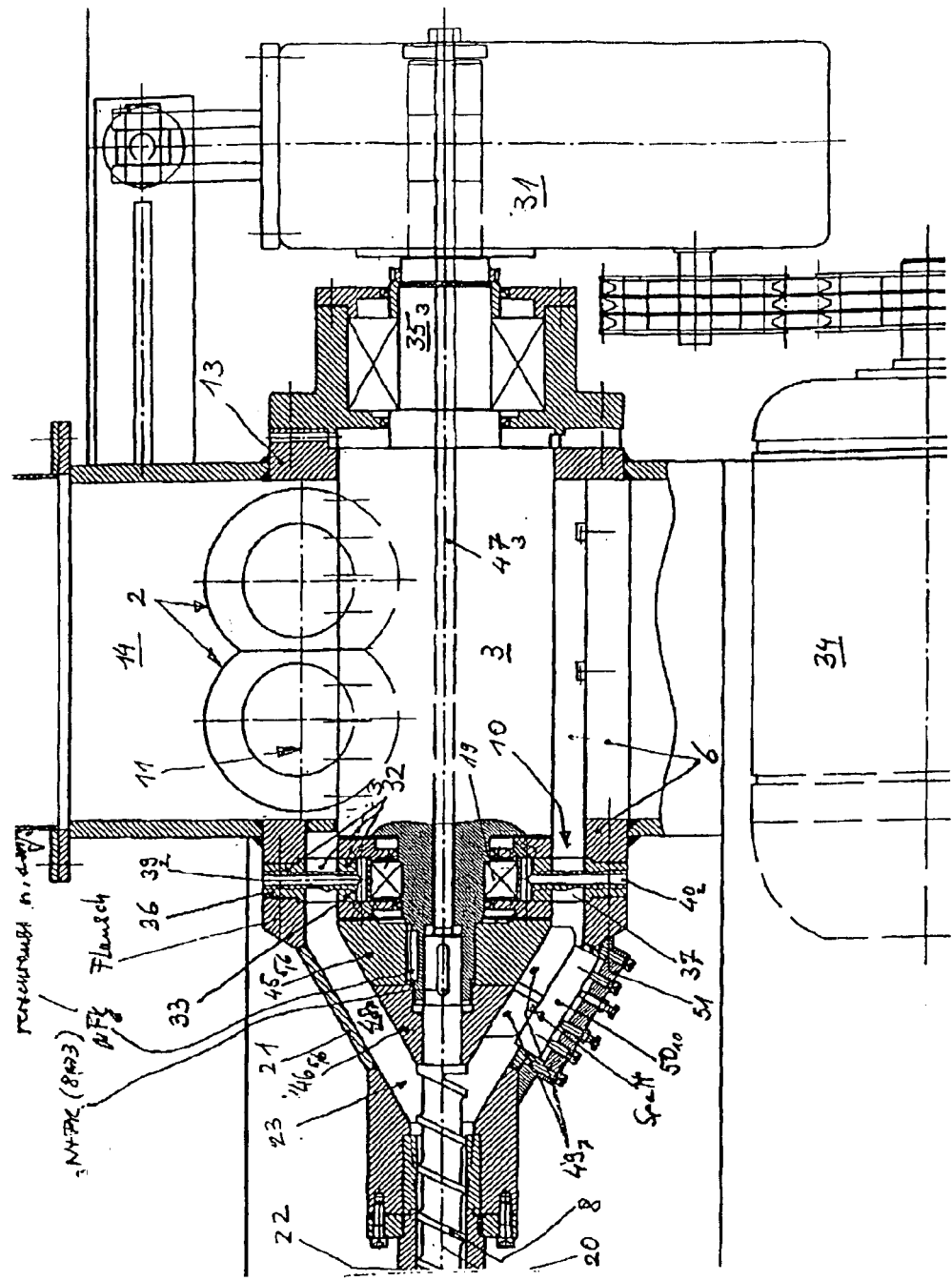
FIG. 5 is a detail sectional view of the embodiment of FIG. 2.
Figure 6:
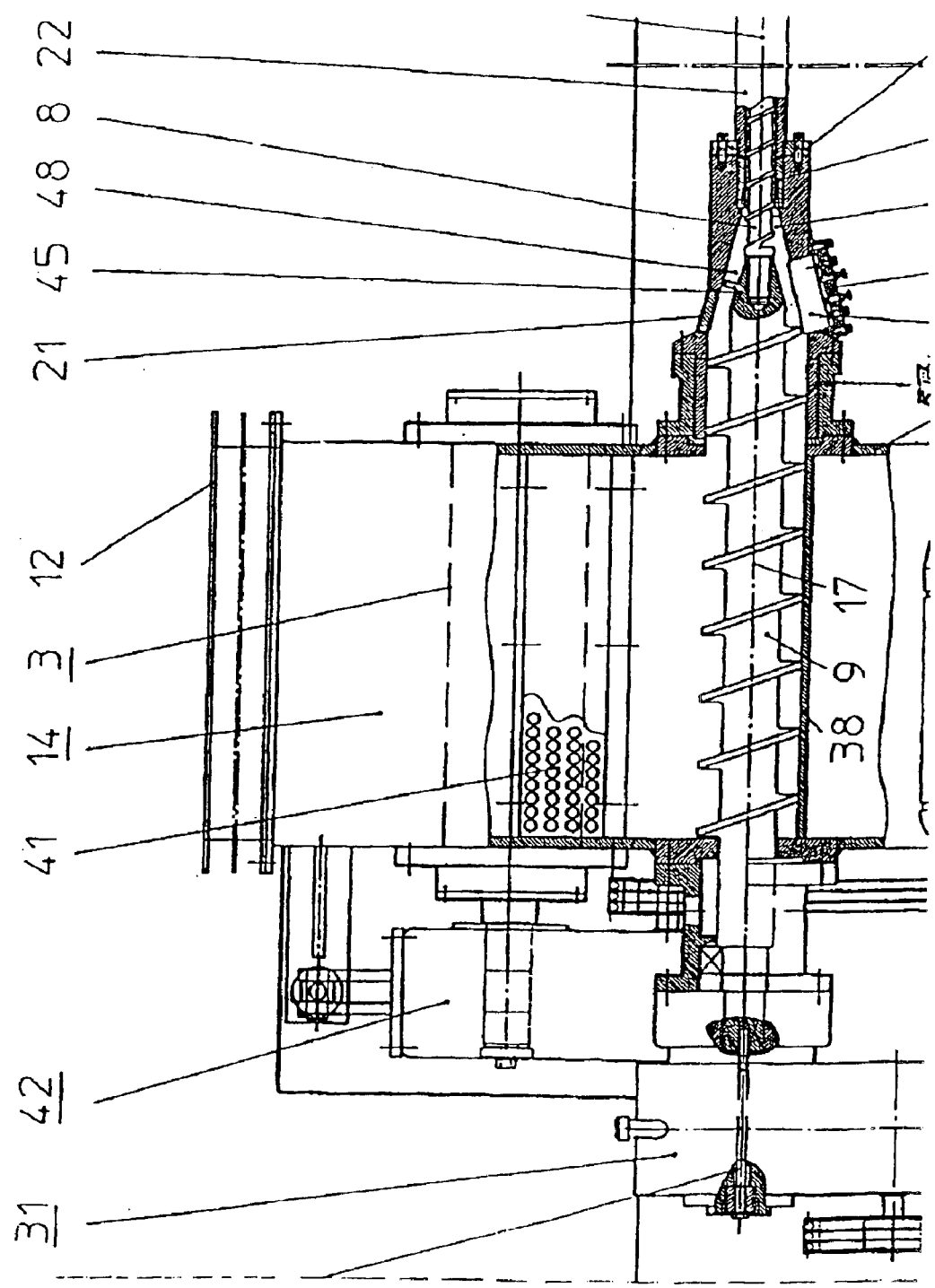
FIG. 6 is a detail side elevational and in part sectional view of the embodiment of FIG. 3.
Figure 7:
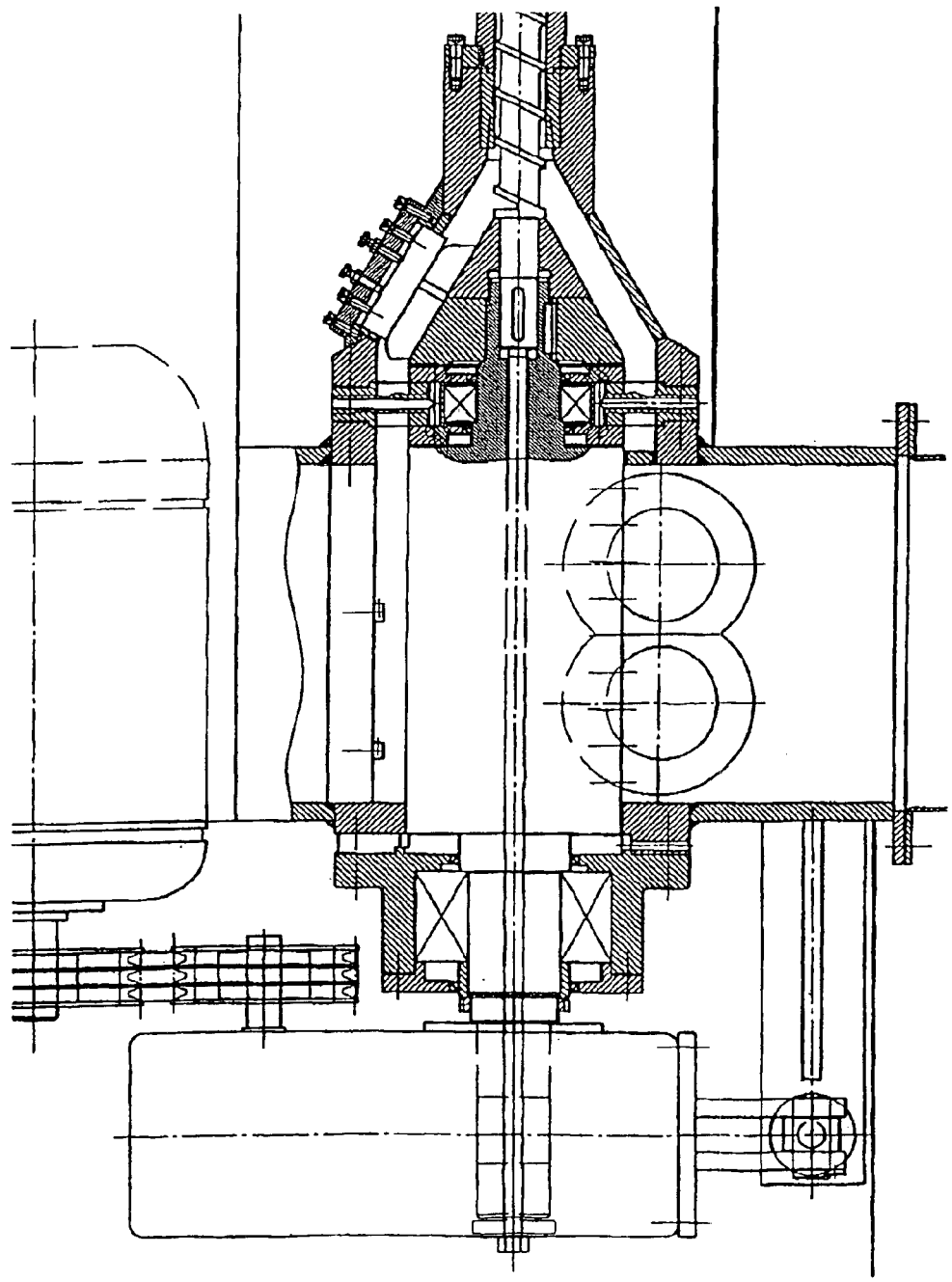
FIG. 7 is a detail sectional view of the embodiment of FIG. 2.

A transport tube 6 is applied at the machine frame 1, wherein a preparatory treatment drum 3 drivenly circulates in the transport tube 6 wherein the preparatory treatment drum 3 together with the drive shaft 35 is supported in the bearing 18 disposed on the transmission side, wherein the bearing 18 is flanged to the machine casing 13 and wherein the preparatory processing drum 3 is supported in a bearing 19 disposed on the extruder side with a journal shaft.

The longitudinal axis 20 of an extruder worm 8 is aligned with the longitudinal axis 17 of the preparatory treatment drum 3, wherein the extruder worm 8 is disengageably mechanically connected to the preparatory treatment drum 3, wherein the extruder worm 8 circulates in a worm tube 22 of the extruder, and wherein a filtering and granulating device 60 is applied at the free end of the extruder.

The arrangement is driven by a drive motor 34 through a transmission 31.

The preparatory treatment drum or processing drum 3 is furnished with knives 4, wherein the knives 4 are screwed on, distributed in three rows, staggered over the circumference, and are attached with a knife support 55 at the receiver part 56 with a spatially fixed counter knife at the opening edge 26 of the run-in side of the knives 4.

The spatially fixed stripping counter knife 54 is applied in the same way on the oppositely disposed longitudinal edge of the charge opening 11.

The conveyor tube 6 is connected to the worm tube 22 through a conical shape transition tube 21, wherein the conical shape transition tube 21 is flanged to the discharge opening 10 of the conveyor tube 6 and to the charge opening 23 of the worm tube 22 and the transition tube 21 bridges the differences in diameter between the conveyor tube 6 and the preparatory treatment drum 3.

A bearing body 32 is flanged between the machine casing 13 and the transition tube 21 following to be conveyor tube 6 of the preparatory treatment drum 3 for the application of the bearing 19 disposed on the extruder side, wherein the transition tube 21 comprises an inner bearing part 33 for the bearing 19 and an outer support ring 36, wherein the two parts are connected with several connection webs 37, wherein the webs 37 exhibit a flow favorable form in the transport direction 28 of the plastic material, and wherein the lubricating lines and the feed line 39 as well as the discharge tube 40 for the bearing air flushing run in the two parts, and wherein the bearing air flushing serves for cleaning of the bearing region.

The mechanical connection of the extruder worm 8 to the processing drum 3 is produced on the one hand by a groove spring wedge connection in the extruder side bearing pin of the processing drum 3 and on the other hand by a two parts bearing body 45,46, wherein the bearing side bearing body 45 of the bearing body 45,46 is attached on the bearing pinned of the processor drum 3 with a groove and spring wedge connection and wherein the cone body 46 on the extruder side seating on the extruder worm 8 is supported at the flank of the extruder worm 8 and is screwed to the bearing pin of the processing drum 3.

A uniformly formed conical transport slot 48 remains between the transition tube 21 and the two parts conical body 45,46 for the transport of the plastic material, wherein the transport slot 48 exhibits an opening angle of 60 degrees.

A transport wing 49 circulates in the transport slot 48, wherein the transport wing 49 is formed as two parts and of which in each case one part is attached on one of the two cone bodies 45,46 and is set transporting in the transport direction 28 toward the entrance opening 23 of the extruder.

A mouthpiece 58 held by a collar flange 59 is applied at the charge opening 23 of the worm tube 22, wherein the inner diameter of the collar flange 59 is larger at the entry opening 23 of the worm tube 22 as compared to the outer diameter of the extruder worm 8 and wherein the inner diameter of the collar flange 59 decreases gradually to the outer diameter of the extruder worm 8 and wherein strips applied at distances at the circumference exhibit the outer diameter of the extruder worm.

The extruder worm 8 is screwed with a support screw 47 coming from the transmission 31, and passing through a bore hole of the drive shaft 35 and the processing drum 3.

A blocking strip 50 disposed opposite to the transport wing 49 is inserted into the transition tube 21 for adjusting the transport of the plastic material, wherein the blocking strip 50 is guided with guides in a counter plate 51 screwed at the transition tube 21 and is blockingly installed of a screwing comprising tension screws and pressure screws up to a slot for adjustment of the slippage of the plastic material between the blocking strip 50 and the transport wing 49.

Two blow-in nozzles 44 for compressed are applied at the inner wall 24 of the conveyor tube 6 at the lowermost position in the transport direction 28 at a distance and acting in this direction.

The plastic material is placed by a charge device 2, wherein the charge device 2 is formed by two next to each other disposed sliders 30, wherein the sliders 30 are shifted by a pneumatic force cylinder 27 in each case on an inclined downwardly disposed floor plate 7, wherein the inclination is toward the opening edge 26 of the feed opening 11, and wherein the force cylinder 27 is supported at an envelope tube 51.

The plastic material is fed to the charge mechanism 2 through a drive shaft 14 with an inclined front wall 15 and with the side walls 16, which side walls 16 close with the feed supply opening 11.

The conveyor tube 6 is furnished with a tube segment 53 removably flanged to the conveyor tube 6, wherein the tube segment 53 reaches from the lowest position in the circulation direction 25 over a quarter of this circumference of the conveyor tube 6.

According to an embodiment of the processing device according to the present invention, the extruder worm 8 is disposed aligned with its longitudinal axis 20 to longitudinal axis 17 of a conveyor screw 9, mechanically connected to the extruder worm 8 and the extruder worm 8 is also screwed with a support screw 47 from the side of the transmission 31.

The conveyor screw 9 is disposed at a screw trough 38, wherein the screw trough 38 is opened upwardly toward the conveyor screw 6 of the processing drum 3.

The free end of the conveyor screw 9 is formed as a cone body 45 and furnishes a cone shaped transport slot 48 to the surrounding transition tube 21 reaching up to the entry opening 23 of the worm tube 22.

The conveyor screw 9 is supportingly guided at the end region on the extruder side, at a cylindrical guide bush 57, wherein the cylindrical guide bush 57 follows to the screw trough 38, wherein the screw trough 38 is attached to a machine frame casing 13.

The processing drum 3 is disposed at a distance above the conveyor screw 9 and parallel to said conveyor screw 9 and the processing drum 3 is supported driven by a separate transmission 42 over a separate drive motor 43 and the processing drum 3 circulates in a conveyor tube 6, wherein the conveyor tube 6 is furnished together with a sieve segment 41, wherein the sieve segment 41 is flangedly and descrewably attached, wherein the sieve segment 41 reaches from the trough wall of the screw trough 38 of the conveyor screw 9 in the circulating direction 25 of the processing drum 3 over a quarter of the circumference of the conveyor tube 6.

The comminuted plastic material falls through the sieve segment 41 into the screw trough 38 and is transported by the conveyor crew 9 to the extruder worm 8.

A blocking strip 50 is applied in the transition tube 21 in the same way as is the case in the first embodiment of the invention and the blocking strip 50 is installed closable relative to the conically formed end of the conveyor screw 9.

Otherwise the construction elements are corresponding to those as can be gathered from the first described arrangement of the invention. In particular the arrangement and the construction of the charge device 2 are the same.

It will be understood that each of the elements described above, or two or more together, may also find a useful application in other types of treatment system configurations and plastic processing procedures differing from the types described above.

While the invention has been illustrated and described as embodied in the context of a processing device for plastic materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent set forth in the appended claims.

| List of reference numerals |
|---|
| 1 machine frame |
| 2 charging mechanism |
| 3 preparatory treatment drum |
| 4 knife of the preparatory treatment drum 3 |
| 5 locally fixed counter knife |
| 6 conveyor tube |
| 7 floor plate |
| 8 extruder worm |
| 9 conveyor screw |
| 10 exit opening of the conveyor tube 6 |
| 11 feed supply opening of the conveyor tube 6 |
| 12 feed funnel |
| 13 machine casing |
| 14 admission shaft of the feed funnel 12 |
| 15 front wall of the feed funnel 12 |
| 16 side wall of the feed funnel 12 |
| 17 longitudinal axis of the preparatory treatment drum 3 or of the conveyor screw 9 |
| 18 transmission side bearing of the preparatory treatment drum 3 or of the conveyor screw 9 |
| 19 extruder side bearing of the preparatory treatment drum 3 or of the conveyor screw 9 |
| 20 longitudinal axis of the extruder worm 8 |
| 21 transition pipe between conveyor tube 6 and worm tube 22 |
| 22 worm tube of the extruder worm 8 |
| 23 charge inlet opening of the worm tube 22 |
| 24 inner wall of the conveyor tube 6 |
| 25 circulation direction of the preparatory treatment drum 3 or of the conveyor screw 9 |
| 26 opening edge of the feed supply opening 11 |
| 27 pneumatic force cylinder of the slider 30 |
| 28 transport direction |
| 29 |
| 30 slider of the charging mechanism 2 |
| 31 transmission for preparatory treatment drum 3 or conveyor screw 9 and the extruder worm 8 |
| 32 bearing body of the bearing 19 disposed on the extruder side |
| 33 inner bearing part of the bearing body 32 |
| 34 drive motor of the preparatory treatment device |
| 35 drive shaft of the preparatory treatment drum 3 |
| 36 outer support ring of the bearing body 32 |
| 37 connecting web of the bearing body 32 |
| 38 screw trough of the conveyor screw 9 |
| 39 feed line for the bearing air flushing |
| 40 discharge line for the bearing air flushing |
| 41 sieve segment for the preparatory treatment drum 3 |
| 42 separate transmission of the preparatory treatment drum 3 |
| 43 separate drive motor of the preparatory treatment drum 3 |
| 44 injection nozzle for flushing gas, such as air |
| 45 bearing side cone body |
| 46 extruder side cone body |
| 47 support screw for the worm shaft 22 of the extruder |
| 48 cone shaped transport slot |
| 49 two part conveyor wing of the cone bodies 45, 46 |
| 50 blocking strip of the transition tube 21 |
| 51 counter plate of the blocking strip 50 |
| 52 enveloping tube or jacket tube of the pneumatic slider 30 |
| 53 tube segment of the conveyor tube 6 |
| 54 stripping counter knife |
| 55 knife support for the knives 4 |
| 56 receiver part for the knife support 55 |
| 57 cylindrical guide bush of the conveyor screw 9 |
| 58 mouthpiece of the worm tube 22 |
| 59 collar flange of the transition tube 21 |
| 60 filtering and/or granulating device |

What is claimed is:

1. A preparatory treatment device for thermoplastic plastic material comprising a comminuting device having a predisposed feed supply shaft with a movable charging mechanism (2) and having an immediately following extruding device, for plastification or for granulating or for agglomeration, wherein the comminuting device comprises a single preparatory treatment drum (3) carrying a knife, wherein the preparatory treatment drum (3) circulates driven in a substantially horizontally disposed conveyor tube (6), wherein the conveyor tube (6) is furnished with an upwardly directed feed supply opening (11) and with an axial discharge outlet opening (10) and wherein the preparatory treatment drum (3) is disposed with a longitudinal axis (17) of the preparatory treatment drum (3) aligned to a longitudinal axis (20) of an extruder worm (8) and wherein the preparatory treatment drum (3) is connected mechanically disengageably to the extruder worm (8) and wherein the preparatory treatment drum (3) and the extruder worm (8) are jointly driven through a transmission (31) by a drive motor (34) and wherein the discharge outlet opening (10) of the conveyor tube (6) and a feed supply opening (23) of a worm tube (22) of the extruder worm (8) are disposed axially successively, and are connected through a transition tube (21), wherein the transition tube (21) is furnished under employing of a bearing body (32) for an extruder side bearing (19) of the preparatory treatment drum (3) with an inner bearing part (33) and an outer support ring (36), wherein the inner bearing part (33) and the outer support ring (36) are supportedly connected by several flow favorably formed connection webs (37) and wherein the connection between the preparatory treatment drum (3) and the extruder worm (8) is furnished by a disengageable connection, characterized in that a cone body is disposed in the transition tube, wherein the cone body is placed on an extruder side bearing pin of the preparatory treatment drum (3), wherein the cone body is fixed against rotation and disengageable connected to the preparatory treatment drum (3), wherein a flank of the extruder worm (8) is supported at the cone body and wherein the cone body together with the transition tube (21) forms a conical transport slot (48), wherein the conical transport slot (48) reaches up to the feed supply opening (23) of the worm tube (22) of the extruder worm (8) and wherein the extruder worm (8) is fixed to the extruder side bearing pin of the extruder side bearing (19) of the preparatory treatment drum (3) fixed against rotation with an involute toothing or a groove and spring wedge connection and wherein the extruder worm (8) is held by a support screw (47), wherein the support screw (47) is led through a bore hole from the side of a drive shaft (35) or wherein the drive shaft (35) is formed by a close tolerance bolt penetrating at a right angle relative to the longitudinal axis (17) of the preparatory treatment drum (3) and to the longitudinal axis (20) of the extruder worm (8).

2. The preparatory treatment device according to claim 1 wherein the bearing body (32) is inserted between the transition tube (21) and the machine casing (13) and is flanged intermediately for the extruder side bearing (19) of the preparatory treatment drum (3), wherein the inner bearing part (33) of the extruder side bearing (19) exhibits essentially the diameter of the preparatory treatment drum (3) and the outer support ring (36) of extruder side bearing (19) exhibits a diameter, which diameter corresponds essentially to an inner diameter of the conveyor tube (6) and wherein the two amongst each other are connected supportingly with the several flow favorable formed connection webs (37).

3. The preparatory treatment device according to claim 2 wherein a feed line (39) and a discharge line (40) for a bearing air flushing line and a lubrication line are led in the connection webs (37).

4. The preparatory treatment device according to claim 1 wherein the cone body bodies disposed in the transition tube (21) is formed as two-part cone bodies, wherein a bearing side cone body (45) on a bearing side of the cone bodies is fixed on the extruder side bearing pin of the preparatory treatment drum (3) with a groove and spring wedge connection and wherein an extruder side cone body (46) on an extruder side of the cone bodies is seated on the extruder worm (8) or is screwed to the bearing side cone body (45).

5. The preparatory treatment device according to claim 1, wherein a cone shape transport slot (48) is formed between the cone body or a two parts cone body (45, 46) and the transition tube (21), wherein the cone shape transport slot (48) exhibits a uniform breadth, wherein at least one transport wing (49) circulates in the cone shape transport slot (48) set for transport in the direction of the feed supply opening (23) of the worm tube (22) of the extruder worm (8).

6. The preparatory treatment device according to claim 5, wherein the cone shaped transport slot (48) exhibits a falling or a rising breadth in the transport direction (28) depending on the transport stock.

7. The preparatory treatment device according to claim 4 wherein at least the one transport wing (49) at the cone body is circulating attached to one of the two cone bodies (45 or 46), wherein the transport wing (49) is formed out of two parts and is attached at the two parts of the cone body (45 and 46).

8. The preparatory treatment device according to claim 5 wherein a blocking strip (50) is inserted into the transition tube (21) disposed opposite to the transport wing (49) and to the two parts of the transport wing (49).

9. The preparatory treatment device according to claim 5 wherein a slot going toward the 0 is inset between two parts of the transport wing (49), and a blocking strip (50).

10. The preparatory treatment device according to claim 9, wherein the blocking strip (50) is supported closably in a counter plate (51) attached at the transition tube (21) with guides through an opening in the transition tube (21) and wherein the blocking strip (50) is attached with tension and pressure screws.

11. The preparatory treatment device according to claim 5, wherein the conical transport slot (48) exhibits an opening angle of from about 20 to 45 degrees.

12. The preparatory treatment device according to claim 1 wherein several injection nozzles are placed at a distance from each other at the inner wall (24) of the conveyor tube (6) of the preparatory treatment drum (3) at the lowest position and operating in axial transport direction (28).

13. The preparatory treatment device according to one of claim 1, wherein the conveyor tube (6) of the preparatory treatment drum (3) is closed with a removably screwed on tube segment (53) reaching over at least a quarter of the circumference from the lowest position of the conveyor tube (6) in the circulating direction (25) of the preparatory treatment drum (3).

14. The preparatory treatment device according to claim 1, wherein knives (4) distributed in three rows and disposed staggered over the circumference amongst each other in axial direction (20) are screwed onto the preparatory treatment drum (3) and wherein the knives cooperate with at least one spatially fixed counter knife (5) and grip through the counter knife, wherein the counter knife (5) is disposed at the opening edge (26) of the feed supply opening (11) of the conveyor tube (6) of the preparatory treatment drum (3).

15. The preparatory treatment device according to claim 1, wherein the feed supply opening (11) of the preparatory treatment drum (3) is placed reaching down at least over about a quarter of a circumference of the conveyor tube (6), from above up to the middle of the conveyor tube (6) and is placed in axial direction (20) essentially over the length of the preparatory treatment drum (3), wherein a slider (30) of the movable charging mechanism (2) feeds plastic material into the preparatory treatment drum (3).

16. The preparatory treatment device according to claim 1, wherein the rotation speed of the preparatory treatment drum (3) is automatically controllable depending on the temperature of the plastic material at the discharge outlet opening (10) of the conveyor tube (6) or of a conveyor trough (38).

17. The preparatory treatment device according to claim 1, wherein the preparatory treatment drum (3) disposed in the conveyor tube (6) is replaced by a transport device, which is formed as the conveyor screw (9) and wherein a comminuting device is predisposed above the feed supply opening (11) of the conveyor tube (6).

18. The preparatory treatment device according to claim 1, wherein the conveyor screw (9) is guided in the transition tube (21) at an end region on the extruder side, supporting itself at a cylindrical guide bush (57), wherein the guide bush (57) is disposed following to a screw trough (38) or the extruder worm (8) is additionally or instead of the extruder side bearing (19) of the conveyor screw (9) supported with a bearing at the end disposed remote relative to the conveyor screw (9).

19. The preparatory treatment device according to claim 1, wherein the preparatory treatment drum (3) is disposed aligned to the extruder worm (8) and aligned disposed parallel to the extruder worm (8) at a distance above the conveyor screw (9) and wherein the preparatory treatment drum (3) is covered downwardly toward the conveyor screw (9) with a disengageably attached sieve segment (41), wherein the sieve segment (41) surrounds at least a lower quarter of the preparatory treatment drum (3) and wherein the sieve segment (41) extends in the circulation direction (25) of the preparatory treatment drum (3) from one trough wall of a screw trough (38) of the conveyor screw (9) open toward the conveyor tube (6) of the preparatory treatment drum (3) and wherein the preparatory treatment drum (3) is driven by a separate transmission (42) and is driven by a separate drive motor (43).

20. The preparatory treatment device according to claim 1, wherein a mouthpiece (58) is inserted at the charge inlet opening (23) of the worm tube (22) of the extruder, wherein an inner diameter of the mouthpiece (58) is larger as compared to an outer diameter of the extruder worm (8) and wherein the inner diameter of the mouthpiece (58) decreases in the transport direction (28) up to the outer diameter of the extruder worm (8), wherein several strips are distributed over the inner circumference, wherein the several strips reach over the length of the mouthpiece and are leaving essentially free the outer diameter of the extruder worm (8) and wherein the several strips exhibit inclined slopes at the beginning of the mouthpiece (58).

21. A preparatory treatment device for thermoplastic plastic material comprising
a substantially horizontally disposed conveyor tube (6), wherein the conveyor tube (6) is furnished with an upwardly directed feed supply opening (11) and with an axial discharge outlet opening (10);
a comminuting device, wherein the comminuting device comprises a knife carrying single preparatory treatment drum (3), wherein the preparatory treatment drum (3) circulates driven in the substantially horizontally disposed conveyor tube (6);

a feed supply shaft predisposed relative to the comminuting device;

a movable charging mechanism (2) connected to the feed supply shaft;

an extruding device immediately following to the conveyor device for plastification and/or for granulating and/or for agglomeration;

an extruder worm (8) having a longitudinal axis (20), a worm tube (22) and a charging inlet opening (23), wherein the preparatory treatment drum (3) is disposed with a longitudinal axis (17) aligned to the longitudinal axis (20) of the extruder worm (8) and wherein the preparatory treatment drum (3) is connected mechanically disengageably to the extruder worm (8);

a transition tube (21);

a drive motor (34);

a transmission (31) connected to the chive motor, wherein the preparatory treatment drum (3) and the extruder worm (8) are jointly driven through the transmission (31) by the drive motor (34) and wherein the discharge outlet opening (10) of the conveyor tube (6) and the charging inlet opening (23) of the worm tube (22) of the extruder worm (8) are disposed axially successively, and are connected through the transition tube (21), wherein the transition tube is furnished under employing of a bearing body (32) for the extruder side bearing (19) of the preparatory treatment drum (3) with an inner bearing part (33) and an outer support ring (36), wherein the inner bearing part (33) and the outer support ring (36) are supportedly connected by several flow favorably formed connection webs (37) and wherein the connection between the preparatory treatment drum (3) on the one hand and the extruder worm (8) on the other hand is furnished by a disengageable connection;

a cone body disposed in the transition tube, wherein the cone body is placed on an extruder side bearing pin of the preparatory treatment drum (3), wherein the cone body is fixed against rotation and disengageable connected to the preparatory treatment drum (3), wherein a flank of the extruder worm (8) is supported at the cone body and wherein the cone body together with the transition tube (21) forms a conical transport slot (48), wherein the conical transport slot (48) reaches up to the charging inlet opening (23) of the worm tube (22) of the extruder worm (8) and wherein the extruder worm (8) is fixed to a bearing pin of the extruder side bearing (19) of the preparatory treatment drum (3) fixed against rotation with an involute toothing or a groove and spring wedge connection and wherein the extruder worm (8) is held by a support screw (47), wherein the support screw (47) is led through a bore hole from the side of the drive shaft (35) or wherein the drive shaft (35) is formed by a close tolerance bolt penetrating at a right angle relative to the axis preparatory treatment drum (3) and extruder worm (8).

22. A preparatory treatment device for thermoplastic plastic material comprising a substantially horizontally disposed conveyor tube (6), wherein the conveyor tube (6) is furnished with an upwardly directed feed supply opening (11) and with an axial discharge outlet opening (10) for comminuted plastic material;

a comminuting device comprising a single preparatory treatment drum (3) carrying a knife;

a feed supply shaft predisposed to the comminuting device;

a movable charging mechanism (2) disposed on the feed supply shaft;

an extruding worm (8) having a longitudinal axis and a worm tube (22) with a feed supply opening (23);

a transition tube (21), wherein the transition tube (21) is flanged to the extruder worm (8) on the side of the discharge outlet opening (10) of the conveyer tube (6) and at the side of the feed supply opening (23) of the worm tube (22) of the extruder worm (8);

a drive motor (34) for driving the preparatory treatment drum (3) connected mechanically disengageably to the extruder worm (8) and wherein the discharge outlet opening (10) of the conveyor tube (6) and the feed supply opening (23) of the worm tube (22) of the extruder worm (8) are disposed axially successively, and are connected through the transition tube (21);

a transmission (31) driven by the drive motor (34) and driving jointly the preparatory treatment drum (3) and the extruder worm (8);

an extruding device immediately following and adjoining to the comminuting device for plastification or for granulating or for agglomeration, wherein the preparatory treatment drum (3) circulates driven in the substantially horizontally disposed conveyor tube (6), and wherein the preparatory treatment drum (3) is disposed with a longitudinal axis (17) of the preparatory treatment drum (3) aligned with the longitudinal axis (20) of the extruder worm (8);

an extruder side bearing (19) of the preparatory treatment drum (3);

a machine casing (13);

a bearing body (32) for the extruder side bearing (19) of the preparatory treatment drum (3) is intermediately flanged between the transition tube (21) and the machine casing (13), wherein an inner bearing part (33) of the bearing body (32) exhibits essentially a diameter of the preparatory treatment drum (3);

an outer support ring (36) of the bearing body (32) exhibiting a diameter corresponding essentially to an inner diameter of the conveyer tube (6);

several flow favorably formed connection webs (37), wherein the inner bearing part (33) and the outer support ring (36) are supportedly connected by the several flow favorably formed connection webs (37).

23. The preparatory treatment device according to claim 22 wherein the bearing body (32) is inserted between the transition tube (21) and the machine casing (13) and is flanged intermediately for the extruder side bearing (19) of the preparatory treatment drum (3), wherein the inner bearing part (33) of the extruder side bearing (19) exhibits essentially a diameter of the preparatory treatment drum (3) and the outer support ring (36) of the extruder side bearing (19) exhibits a diameter, which diameter corresponds essentially to an inner diameter of the conveyor tube (6) and wherein the two amongst each other are connected supportingly with the several flow favorable formed connection webs (37).

24. The preparatory treatment device according to claim 23 further comprising a feed line (39) and a discharge line (40) for bearing air flushing and lubrication lines and led in the connection webs (37).

25. The preparatory treatment device according to claim 22 further comprising two part cone bodies disposed in the transition tube (21), wherein a cone body (45) on a bearing side of the two part cone bodies is fixed on an extruder side bearing pin of the preparatory treatment drum (3) with a groove and spring wedge connection and wherein a cone body (46) on an extruder side of the two part cone bodies is seated on the extruder worm (8) or is screwed to the bearing side cone body (45).

26. The preparatory treatment device according to claim 22 further comprising a cone shape transport slot (48) formed between the two parts cone bodies (45, 46) and the transition tube (21), wherein the cone shape transport slot (48) exhibits a uniform breadth;

at least one transport wing (49) circulating in the cone shape transport slot (48) set for transport in the direction of the feed supply opening (23) of the worm tube (22) of the extruder worm (8).

27. The preparatory treatment device according to claim 26, wherein the cone shaped transport slot (48) exhibits a falling or a rising breadth in the transport direction (28) depending on the transport stock.

28. The preparatory treatment device according to claim 26 wherein at least the one transport wing (49) at the two parts cone bodies is circulating attached to one of the two cone bodies (45, 46), wherein the transport wing (49) is formed out of two parts and is attached at the two parts of the two parts cone bodies (45, 46).

29. The preparatory treatment device according to claim 28 further comprising a blocking strip (50) is inserted into the transition tube (21) disposed opposite to the transport wing (49) and opposite to the two parts of the transport wing (49).

30. The preparatory treatment device according to claim 28 further comprising a slot going toward 0 is inset between the transport wing (49) and the blocking strip (50) and between the two parts of the transport wing (49), and the blocking strip (50).

31. The preparatory treatment device according to claim 30, wherein the blocking strip (50) is supported closably in a counter plate (51) attached at the transition tube (21) with guides through an opening in the transition tube (21) and wherein the blocking strip (50) is attached with tension and pressure screws.

32. The preparatory treatment device according to claim 26, wherein the cone shape transport slot (48) exhibits an opening angle of several degrees up to 90 degrees.

33. The preparatory treatment device according to claim 22 further comprising several injection nozzles placed at a distance from each other at an inner wall (24) of the conveyor tube (6) of the preparatory treatment drum (3) at the lowest position and operating in axial transport direction (28).

34. The preparatory treatment device according to claim 22 further comprising a removably screwed on tube segment (55), wherein the conveyor tube (6) of the preparatory treatment drum (3) is closed with the removably screwed on tube segment (53) reaching over at least a quarter of the circumference from the lowest position of the conveyor tube (6) in the circulating direction (25) of the preparatory treatment drum (3).

35. The preparatory treatment device according to claim 22, wherein knives (4) distributed in several rows and disposed staggered over the circumference amongst each other in axial direction (20) are screwed onto the preparatory treatment drum (3) and wherein the knives (4) cooperate with at least one spatially fixed counter knife (5) and grip through the counter knife, wherein the counter knife (5) is disposed at the opening edge (26) of the feed supply opening (11) of the conveyor tube (6) of the preparatory treatment drum (3).

36. The preparatory treatment device according to claim 22, wherein the feed supply opening (11) of the preparatory treatment drum (3) is placed reaching down at least over about a quarter of the circumference of the conveyor tube (6), from above up to the middle of the conveyor tube (6) and is placed in axial direction (20) essentially over the length of the preparatory treatment drum (3), and further comprising a movable charging mechanism (2);

a slider (30) of the movable charging mechanism (2) feeding the plastic material into the preparatory treatment drum (3).

37. The preparatory treatment device according to claim 22 wherein the rotation speed of the preparatory treatment drum (3) is automatically controllable depending on the temperature of the plastic material at the discharge outlet opening (10) of the conveyor tube (6) or of a conveyor trough (38).

38. The preparatory treatment device according to claim 22, further comprising a mouthpiece (58) inserted at the charge inlet opening (23) of the worm tube (22) of the extruder worm (8), wherein an inner diameter of the mouthpiece (58) is larger as compared to an outer diameter of the extruder worm (8) and wherein the inner diameter of the mouthpiece (58) decreases in the transport direction (28) up to the outer diameter of the extruder worm (8), wherein several strips are distributed over the inner circumference, wherein the several strips reach over the length of the mouthpiece and are leaving essentially free the outer diameter of the extruder worm (8) and wherein the several strips exhibit inclined slopes at a beginning of the mouthpiece (58).

39. A preparatory treatment device for a thermoplastic, plastic material comprising a comminuting device with a predisposed feed supply shaft with a movable charging mechanism (2) and out of an immediately following extruding device, for plastification and/or for granulating or for agglomeration, wherein the comminuting device comprises a knife carrying single preparatory treatment drum (3), wherein the preparatory treatment drum (3) circulates driven in a substantially horizontally disposed conveyor tube (6), wherein the conveyor tube (6) is furnished with an upwardly directed feed supply opening (11) and with an axial discharge outlet opening (10) for the comminuted plastic material and wherein the preparatory treatment drum (3) is disposed with its longitudinal axis (17) aligned to the longitudinal axis (20) of the extruder worm (8) and with a transmission (31) and a drive motor (34) for driving the preparatory treatment drum (3) connected mechanically disengageably to the extruder worm (8) and wherein the discharge outlet opening (10) of the conveyor tube (6) and the feed supply opening (23) of the worm tube (22) of the extruder worm (8) are disposed axially successively, and are connected through a transition tube (21), wherein the transition tube (21) is flanged to the extruder worm on the side of the discharge outlet opening (10) of the conveyer tube (6) and at the side of the feed supply opening (23) of the worm tube (22) of the worm extruder wherein a bearing body (32) for an extruder side bearing (19) of the preparatory treatment drum (3) is intermediately flanged between the transition tube (21) and a machine casing (13), wherein an inner bearing part (33) of the bearing body (32) exhibits essentially a diameter of the preparatory treatment drum and wherein an outer support ring (36) of the bearing body (32) exhibits a diameter corresponding essentially to an inner diameter of the conveyer tube (6), wherein the inner bearing part (33) and the outer support ring (36) are supportedly connected by several flow favorably formed connection webs (37).

* * * * *